United States Patent
Roshan Fekr et al.

(10) Patent No.: US 12,410,712 B1
(45) Date of Patent: Sep. 9, 2025

(54) ROTOR BLADE WITH APERTURED COOLING AIR DEFLECTOR

(71) Applicant: Pratt & Whitney Canada Corp., Longueuil (CA)

(72) Inventors: Masoud Roshan Fekr, St-Lambert (CA); Othmane Leghzaouni, Boucherville (CA); Robert Huszar, Saint-Bruno-de-Montarville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/894,971

(22) Filed: Sep. 24, 2024

(51) Int. Cl.
*F01D 5/08* (2006.01)
*F01D 5/18* (2006.01)
*F01D 5/30* (2006.01)

(52) U.S. Cl.
CPC .............. *F01D 5/081* (2013.01); *F01D 5/082* (2013.01); *F01D 5/187* (2013.01); *F01D 5/3007* (2013.01); *F05D 2240/81* (2013.01)

(58) Field of Classification Search
CPC .......... F01D 5/081; F01D 5/082; F01D 5/186; F01D 5/187; F01D 5/3007; F05D 2260/20; F05D 2260/21; F05D 2240/81
See application file for complete search history.

(56) References Cited

U.S. PATENT DOCUMENTS

| | | | |
|---|---|---|---|
| 6,974,306 B2 | 12/2005 | Djeridane | |
| 6,981,845 B2 | 1/2006 | Balland | |
| 7,198,466 B2 | 4/2007 | Townes | |
| 9,181,805 B2 | 11/2015 | Coutandin | |
| 2012/0171046 A1* | 7/2012 | Boyer | F01D 5/081 29/889.721 |
| 2024/0068368 A1* | 2/2024 | Shteyman | F01D 5/087 |

\* cited by examiner

*Primary Examiner* — Christopher Verdier
(74) *Attorney, Agent, or Firm* — Getz Balich LLC

(57) ABSTRACT

A rotor blade includes an airfoil, a root, a cooling air passage and a cooling air deflector. The root extends axially along an axis between a first end of the root and a second end of the root. The root extends laterally between a first side of the root and a second side of the root. The root projects radially inward and away from the airfoil to an inner end of the root. The cooling air passage includes a passage inlet disposed at the inner end. The cooling air passage projects radially into the rotor blade from the passage inlet. The cooling air deflector projects radially inward from the inner end of the root to an inner end of the cooling air deflector. The cooling air deflector is disposed at the second side and is spaced laterally from the first side. The cooling air deflector includes a cooling air aperture.

18 Claims, 11 Drawing Sheets

US 12,410,712 B1

ROTOR BLADE WITH APERTURED COOLING AIR DEFLECTOR

TECHNICAL FIELD

This disclosure relates generally to an aircraft and, more particularly, to a rotor blade for the aircraft.

BACKGROUND INFORMATION

A bladed rotor of a gas turbine engine typically includes a plurality of rotor blades arranged around and mounted to a rotor disk. Various types of mounting arrangements are known in the art for mounting rotor blades to a rotor disk. Various arrangements are also known in the art for directing cooling air into one or more internal passages within a rotor blade. While these known arrangements have various benefits, there is still room in the art for improvement.

SUMMARY

According to an aspect of the present disclosure, an apparatus is provided for a turbine engine. This turbine engine apparatus includes a rotor blade configured to rotate about an axis. The rotor blade includes an airfoil, a root, a cooling air passage and a cooling air deflector. The root extends axially along the axis between a first end of the root and a second end of the root. The root extends laterally between a first side of the root and a second side of the root. The root projects radially inward towards the axis and away from the airfoil to an inner end of the root. The cooling air passage includes a passage inlet disposed at the inner end of the root. The cooling air passage projects radially into the rotor blade from the passage inlet. The cooling air deflector projects radially inward towards the axis from the inner end of the root to an inner end of the cooling air deflector. The cooling air deflector is disposed at the second side of the root and is spaced laterally from the first side of the root. The cooling air deflector includes a cooling air aperture that extends laterally through the cooling air deflector.

According to another aspect of the present disclosure, another apparatus is provided for a turbine engine. This turbine engine apparatus includes a rotor blade configured to rotate about an axis. The rotor blade includes an airfoil, a root, a cooling air passage and a cooling air deflector. The root extends axially along the axis between a forward end of the root and an aft end of the root. The root extends laterally between a first side of the root and a second side of the root. The root projects radially inward towards the axis to a bottom end of the root. The cooling air passage includes a passage inlet formed in the bottom end of the root. The cooling air passage projects radially outward away from the axis into the root from the passage inlet. The cooling air deflector projects radially inward towards the axis from the bottom end of the root. The cooling air deflector is disposed laterally between the passage inlet and the second side of the root. The cooling air deflector axially overlaps the passage inlet. The cooling air deflector includes a cooling air aperture extending through the cooling air deflector from an axial end of the cooling air deflector to a lateral side of the cooling air deflector.

According to still another aspect of the present disclosure, another apparatus is provided for a turbine engine. This turbine engine apparatus includes a rotor disk and a rotor blade. The rotor disk is configured to rotate about an axis and includes a slot. The rotor blade includes an airfoil, a root, a cooling air passage and a cooling air deflector. The root is received within the slow to mount the rotor blade to the rotor disk. The cooling air passage projects radially into the root from a passage inlet in a bottom end of the root. The passage inlet fluidly couples the cooling air passage to a plenum radially between the bottom end of the root and a bottom end of the slot. The cooling air deflector is configured to direct a first portion of cooling air flowing within the plenum towards the passage inlet. The cooling air deflector includes a cooling air aperture configured to direct a second portion of cooling air flowing within the plenum to a clearance gap laterally between the cooling air deflector and a sidewall of the slot.

The cooling air aperture may also extend axially through the cooling air deflector.

A centerline of the cooling air deflector may be angularly offset from the axis by an acute offset angle when viewed in a reference plane parallel to the inner end of the root.

The acute offset angle may be between ten degrees and sixty degrees.

A centerline of the cooling air deflector may be angularly offset from the axis by an acute offset angle when viewed in a reference plane perpendicular to the inner end of the root.

The acute offset angle may be equal to or less than sixty degrees.

A centerline of the cooling air deflector may be parallel with the axis when viewed in a reference plane perpendicular to the inner end of the root.

The cooling air aperture may have a circular cross-sectional geometry when viewed in a reference plane perpendicular to a centerline of the cooling air aperture.

The cooling air aperture may have a non-circular cross-sectional geometry when viewed in a reference plane perpendicular to a centerline of the cooling air aperture.

The cooling air deflector may extend axially between a first end of the cooling air deflector and a second end of the cooling air deflector. The cooling air deflector may extend laterally between a first side of the cooling air deflector and a second side of the cooling air deflector. The cooling air aperture may extend laterally through the cooling air deflector from an aperture inlet to an aperture outlet. The aperture inlet may be disposed at the first end of the cooling air deflector. The aperture outlet may be disposed at the second side of the cooling air deflector.

The second side of the cooling air deflector may be contiguous with the second side of the root.

The first side of the cooling air deflector may be laterally next to the passage inlet.

The cooling air deflector may be disposed laterally between the passage inlet and the second side of the root. The cooling air deflector may axially overlap along the passage inlet.

The rotor blade may also include a flange disposed between (a) the passage inlet and the cooling air deflector and (b) the second end of the root. The flange may project radially inward towards the axis from the inner end of the root. The flange may extend laterally across the inner end of the root from the first side of the root to the second side of the root.

The root may be a firtree root.

The root may include a first laterally undulating surface and a second laterally undulating surface. The first laterally undulating surface may at least partially form the first side of the root. The second laterally undulating surface may at least partially form the second side of the root.

The rotor blade may also include a platform radially between and connecting the airfoil and the root.

The turbine engine apparatus may also include a rotor disk configured to rotate about the axis. The rotor disk may include a slot. The root may be mated with the slot to mount the rotor blade to the rotor disk. The cooling air aperture may be configured to direct cooling air to a clearance gap between the cooling air deflector and a sidewall of the slot.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
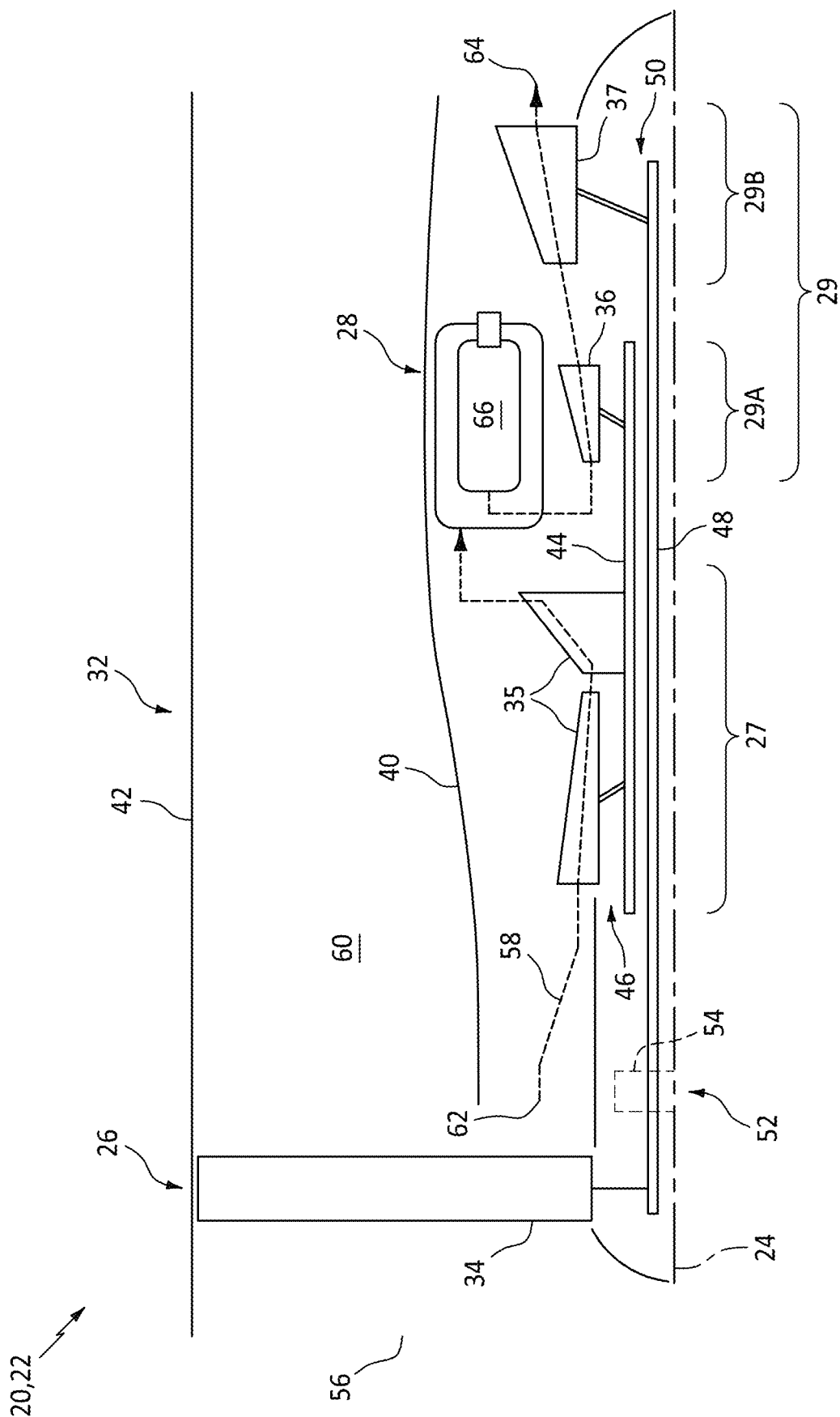
FIG. 1 is a partial side schematic illustration of a powerplant of an aircraft propulsion system.

FIG. 1 illustrates a powerplant 20 of a propulsion system for an aircraft. The aircraft may be an airplane, a rotorcraft (e.g., a helicopter), a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such an exemplary aircraft propulsion system. The aircraft propulsion system, for example, may alternatively be configured as a turbojet propulsion system, a turboprop propulsion system, a turboshaft propulsion system or an open rotor propulsion system. Moreover, the present disclosure is not limited to propulsion system applications. The turbine engine 22, for example, may alternatively be configured as or included as part of an auxiliary power unit (APU) for the aircraft, a ground-based (e.g., industrial) electrical power system or a marine-based propulsion and/or electrical power system.

The turbine engine 22 of FIG. 1 extends axially along an axis 24 between a forward, upstream end of the turbine engine 22 and an aft, downstream end of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 26 (e.g., a fan section), a compressor section 27, a combustor section 28 and a turbine section 29. The turbine section 29 includes a high pressure turbine (HPT) section 29A and a low pressure turbine (LPT) section 29B.

The engine sections 26-29B may be arranged along the axis 24 within a stationary engine housing 32. The propulsor section 26 includes a bladed propulsor rotor 34; e.g., a fan rotor. The compressor section 27 includes one or more bladed compressor rotors 35. The HPT section 29A includes a bladed high pressure turbine (HPT) rotor 36. The LPT section 29B includes a bladed low pressure turbine (LPT) rotor 37; e.g., a power turbine (PT) rotor. These engine rotors 34-37 are housed within the engine housing 32. The engine housing 32 of FIG. 1, for example, includes an inner housing structure 40 (e.g., a core case structure) and an outer housing structure 42 (e.g., a propulsor case structure). The inner housing structure 40 may house one or more of the engine sections 27-29B and their engine rotors 35-37. The outer housing structure 42 may house at least the propulsor section 26 and its propulsor rotor 34.

The compressor rotors 35 are coupled to and rotatable with the HPT rotor 36. The compressor rotors 35 of FIG. 1, for example, are connected to the HPT rotor 36 through a high speed shaft 44. At least (or only) the compressor rotors 35, the HPT rotor 36 and the high speed shaft 44 collectively form a high speed rotating assembly 46; e.g., a high speed spool of a core of the turbine engine 22. This high speed rotating assembly 46 of FIG. 1 and its members 35, 36 and 44 are rotatable about the axis 24.

The LPT rotor 37 of FIG. 1 is connected to a low speed shaft 48. At least (or only) the LPT rotor 37 and the low speed shaft 48 collectively form a low speed rotating assembly 50; e.g., a low speed spool of the engine core. This low speed rotating assembly 50 is further coupled to the propulsor rotor 34 through a drivetrain 52. This drivetrain 52 may be configured as a geared drivetrain, where a geartrain 54 (e.g., a transmission, a speed change device, an epicyclic geartrain, etc.) is disposed between and operatively couples the propulsor rotor 34 to the low speed rotating assembly 50 and its LPT rotor 37. With this arrangement, the propulsor rotor 34 may rotate at a different (e.g., slower) rotational speed than the low speed rotating assembly 50 and its LPT rotor 37. Here, the propulsor rotor 34 and the low speed rotating assembly 50 may rotate in a common (the same) direction about the axis 24 or in opposite directions about the axis 24 depending, for example, upon the specific configuration of the geartrain 54. Alternatively, the drivetrain 52 may be configured as a direct drive drivetrain, where the geartrain 54 is omitted. With such an arrangement, the propulsor rotor 34 rotates at a common (the same) rotational speed as the low speed rotating assembly 50 and its LPT rotor 37. The low speed rotating assembly 50 of FIG. 1 and its members 37 and 48 as well as the propulsor rotor 34 are rotatable about the axis 24.

During operation, ambient air from outside of the aircraft enters the aircraft powerplant 20 and its turbine engine 22 through an airflow inlet 56. This air is directed across the propulsor section 26 and into a (e.g., annular) core flowpath 58 and a (e.g., annular) bypass flowpath 60. The core flowpath 58 of FIG. 1 extends sequentially through the compressor section 27, the combustor section 28, the HPT section 29A and the LPT section 29B from an airflow inlet 62 into the core flowpath 58 to a combustion products exhaust 64 out from the core flowpath 58 and the engine core. The air entering the core flowpath 58 may be referred to as "core air". The bypass flowpath 60 extends through a bypass duct, which bypass flowpath 60 bypasses (e.g., is disposed radially outboard of and extends along) the engine core. The air within the bypass flowpath 60 may be referred to as "bypass air".

The core air is compressed by the compressor rotors 35 and is directed into a (e.g., annular) combustion chamber 66 of a (e.g., annular) combustor in the combustor section 28. Fuel is injected into the combustion chamber 66 by one or more fuel injectors and mixed with the compressed core air to provide a fuel-air mixture. This fuel-air mixture is ignited and combustion products thereof flow through and sequentially drive rotation of the HPT rotor 36 and the LPT rotor 37 about the axis 24. The rotation of the HPT rotor 36 drives rotation of the compressor rotors 35 about the axis 24 and, thus, compression of the air received from the core inlet 62. The rotation of the LPT rotor 37 drives rotation of the propulsor rotor 34 through the drivetrain 52. The rotation of the propulsor rotor 34 propels the bypass air through and out of the bypass flowpath 60. The propulsion of the bypass air may account for a majority of thrust generated by the turbine engine 22 of FIG. 1.

Figure 2:
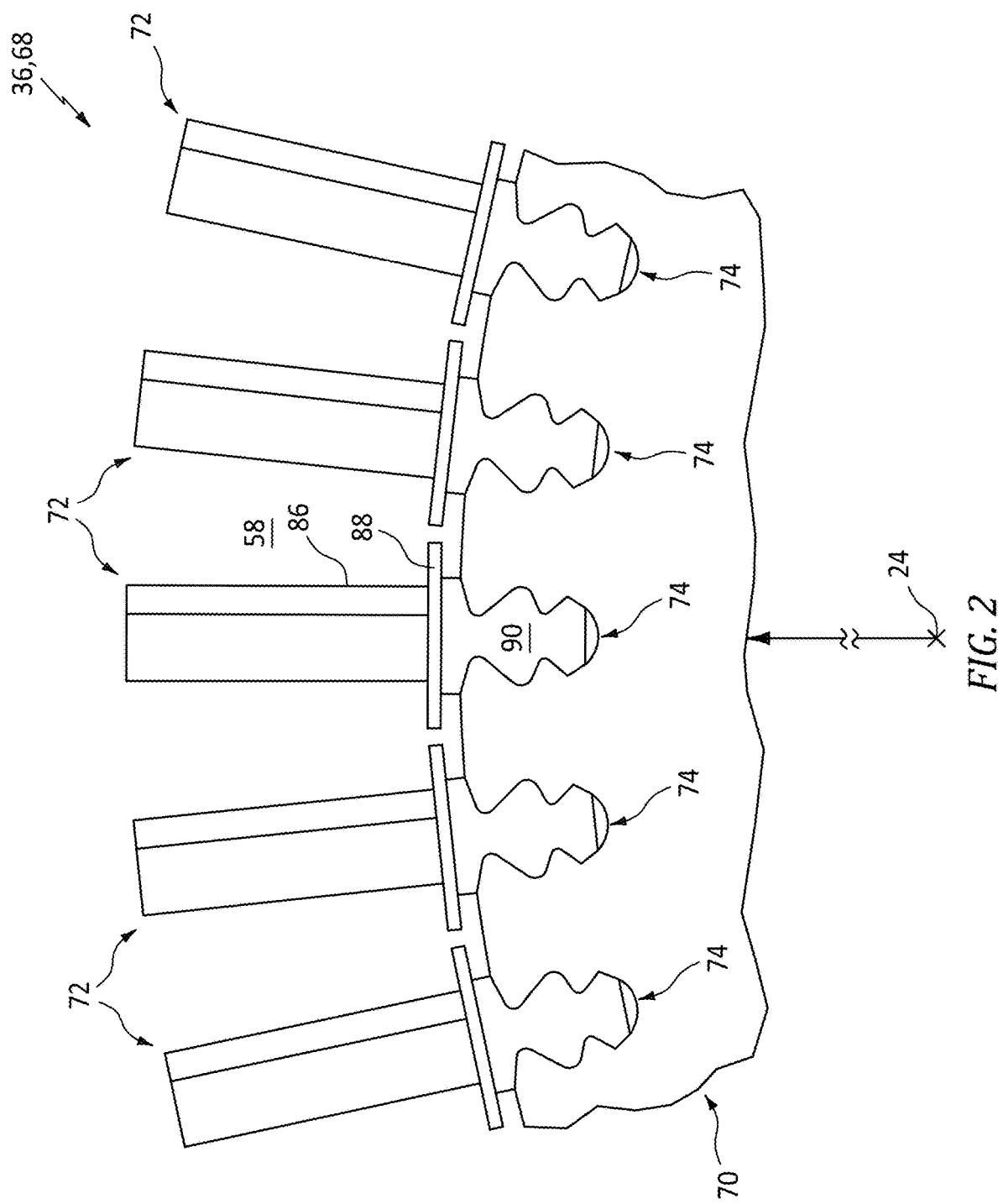
FIG. 2 is a partial end view illustration of an engine rotor.

FIG. 2 illustrates a portion of a bladed engine rotor 68 such as a turbine rotor. For ease of description, this engine rotor 68 is described below as being configured as or otherwise included as part of the HPT rotor 36 in FIG. 1. It is contemplated, however, the engine rotor 68 may alternatively be configured as or otherwise included as part of the LPT rotor 37 in FIG. 1 or any other bladed rotor included in a turbine engine which utilizes cooling air. The engine rotor 68 of FIG. 2 includes a rotor disk 70 (e.g., a turbine disk) and a plurality of rotor blades 72 (e.g., turbine blades).

Figure 3:
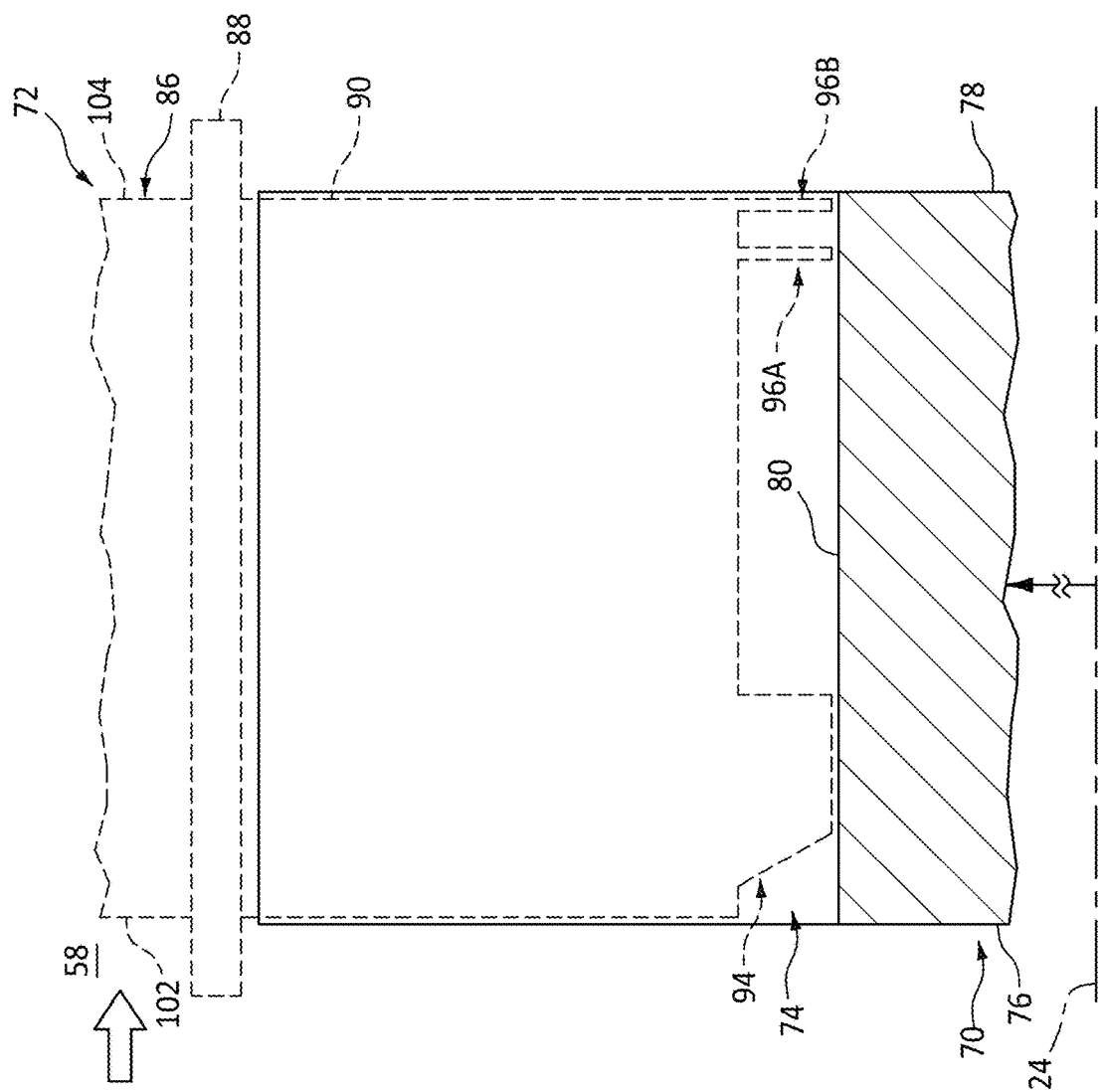
FIG. 3 is a partial sectional illustration of a rotor disk with a rotor blade in dashed line form.
Figure 4:
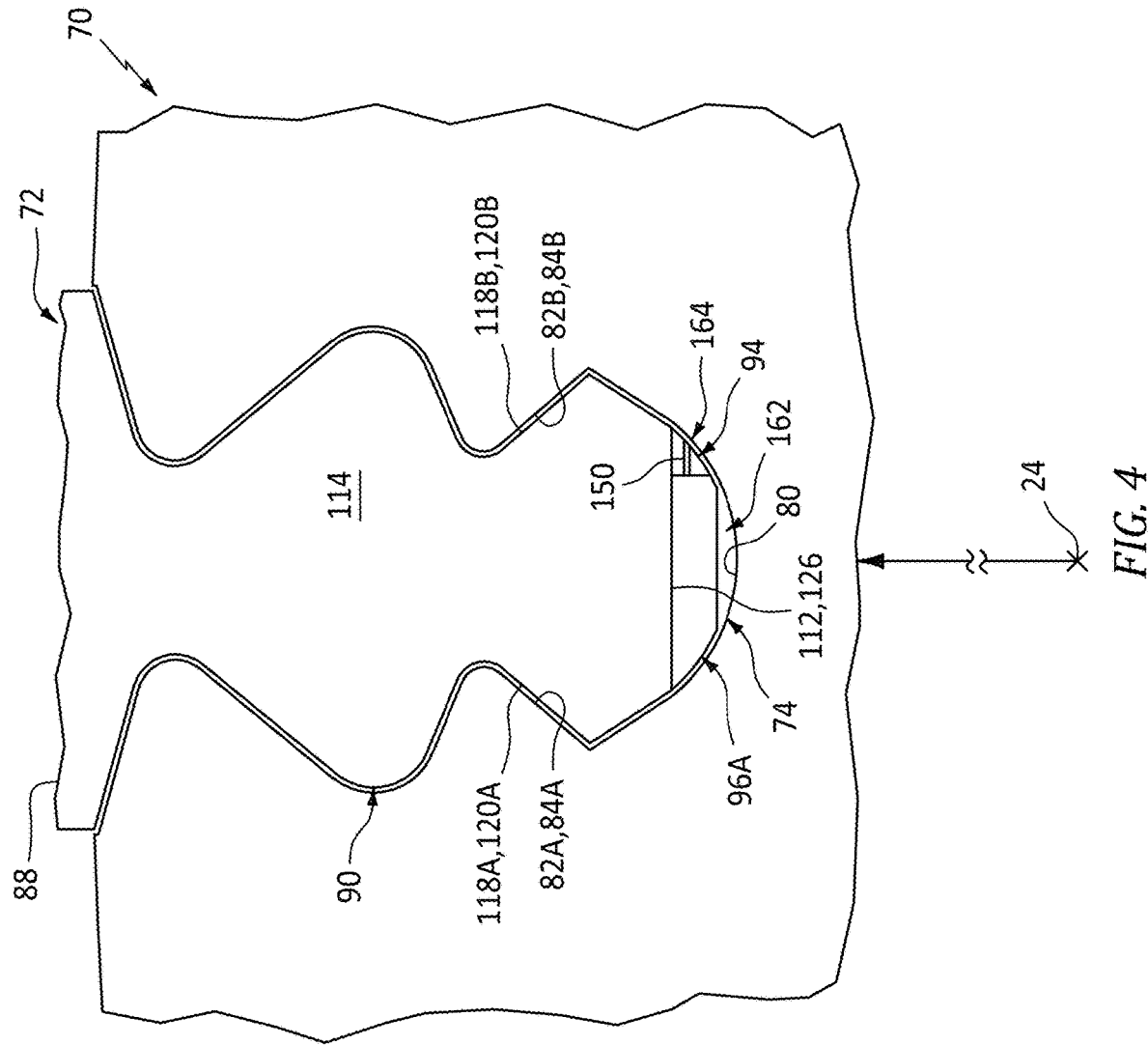
FIG. 4 is a partial end view illustration of a blade root of the rotor blade mated with a slot in the rotor disk.

The rotor disk 70 includes a plurality of disk slots 74. These disk slots 74 are arranged and may be equispaced circumferentially about the axis 24 in an annular array; e.g., a circular array. Referring to FIG. 3, each disk slot 74 extends axially along the axis 24 through the rotor disk 70 from an axial upstream end 76 of the rotor disk 70 to an axial downstream end 78 of the rotor disk 70. However, it is contemplated this disk slot 74 may alternatively project partially axially into the rotor disk 70 from a respective one of the axial disk ends 76, 78 in other embodiments. Here, the disk upstream end 76 is upstream of the disk downstream end 78 relative to a flow of gas (e.g., the combustion products) within the core flowpath 58 longitudinally across the rotor blades 72. Each disk slot 74 projects partially radially into the rotor disk 70 from a radial outer periphery of the rotor disk 70 (e.g., a rim of the rotor disk 70) to a radial inner endwall 80 (e.g., bottom end) of the respective disk slot 74. Referring to FIG. 4, the disk slot 74 extends laterally (e.g., circumferentially or tangentially) between and to laterally opposing sidewalls 82A and 82B (generally referred to as "82") of the respective disk slot 74. Each of these slot sidewalls 82A, 82B may be at least partially or completely formed by a respective laterally undulating (e.g., a wavy, splined) surface 84A, 84B (generally referred to as "84") of the rotor disk 70. With this arrangement, each disk slot 74 may be configured as a firtree slot. The present disclosure, however, is not limited to such an exemplary geometry. For example, in other embodiments, each disk slot 74 may alternatively be configured as a dovetail slot or a slot with another flared and/or keyed geometry.

Figure 5:
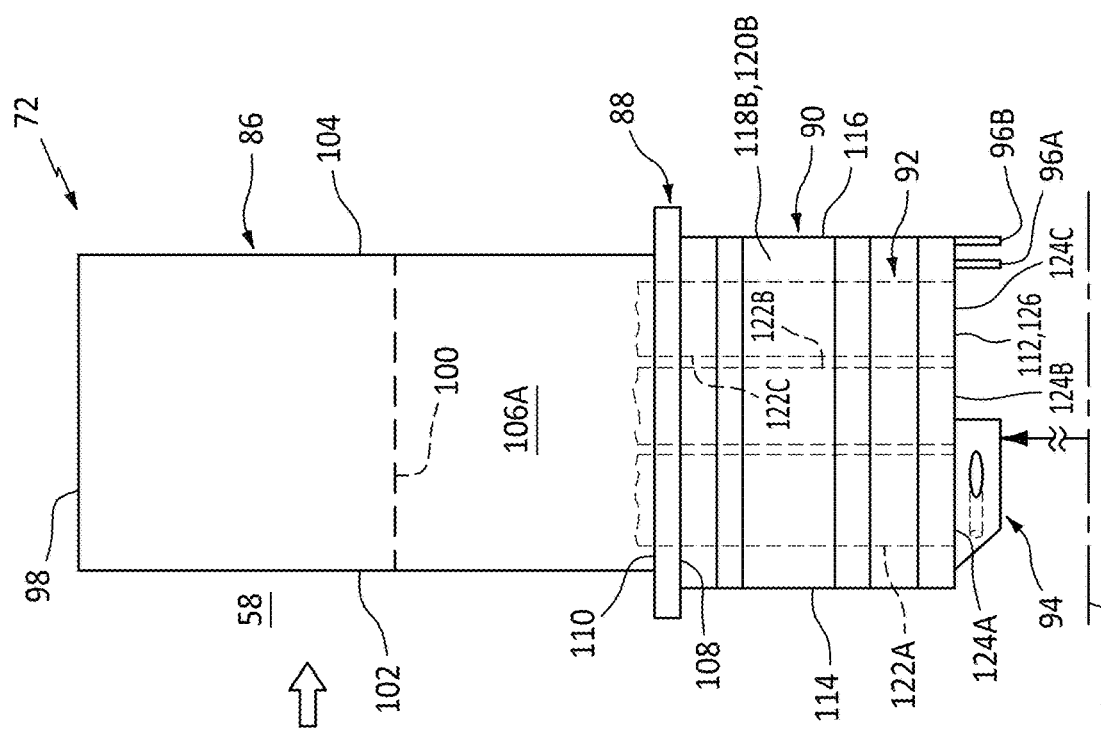
FIG. 5 is a side illustration of the rotor blade.

Referring to FIG. 5, each rotor blade 72 includes an airfoil 86, a platform 88 and a root 90. Each rotor blade 72 of FIG. 5 also includes an internal cooling circuit 92, a cooling air deflector 94 for the blade cooling circuit 92, and one or more flanges 96A and 96B (generally referred to as "96").

Figure 6:
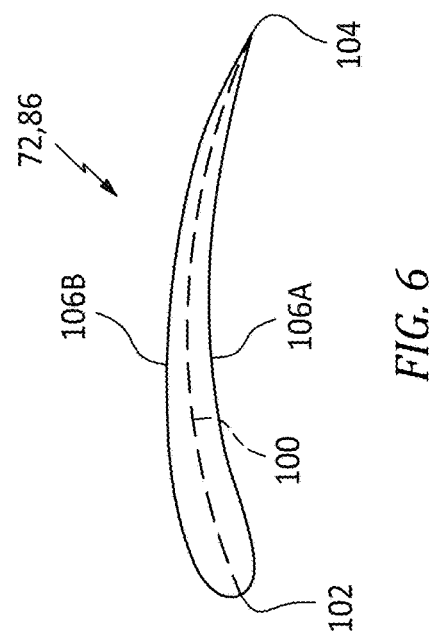
FIG. 6 is a cross-sectional illustration of an airfoil of the rotor blade.

The blade airfoil 86 projects spanwise and radially outward (e.g., away from the axis 24) out from the blade platform 88 to a tip 98 (e.g., a radial outer distal end) of the blade airfoil 86. The blade airfoil 86 extends longitudinally along a longitudinal mean line 100 (e.g., a camber line) of the blade airfoil 86 from a leading edge 102 of the blade airfoil 86 to a trailing edge 104 of the blade airfoil 86. Referring to FIG. 6, the blade airfoil 86 extends widthwise between a concave, pressure side 106A of the blade airfoil 86 and a convex, suction side 106B of the blade airfoil 86. These airfoil sides 106A and 106B (generally referred to as "106") extend longitudinally between and meet at the airfoil leading edge 102 and the airfoil trailing edge 104. Referring to FIG. 5, each of the airfoil members 102, 104 and 106 may project spanwise and radially outward from the blade platform 88 to the airfoil tip 98.

The blade platform 88 is disposed radially between the blade airfoil 86 and the blade root 90. The blade platform 88 of FIG. 5 is also connected to (e.g., formed integral with or otherwise attached to) the blade airfoil 86 and the blade root 90. The blade platform 88 extends radially between a radial inner side 108 of the blade platform 88 and a radial outer side 110 of the blade platform 88. The platform inner side 108 is disposed radially next to the blade root 90. The platform outer side 110 is disposed radially next to the blade airfoil 86. This platform outer side 110 is configured to form a portion of a radial inner peripheral boundary of the core flowpath 58 longitudinally along the respective rotor blade 72. The blade airfoil 86 thereby projects radially out from the blade platform 88 into the core flowpath 58.

Figure 7:
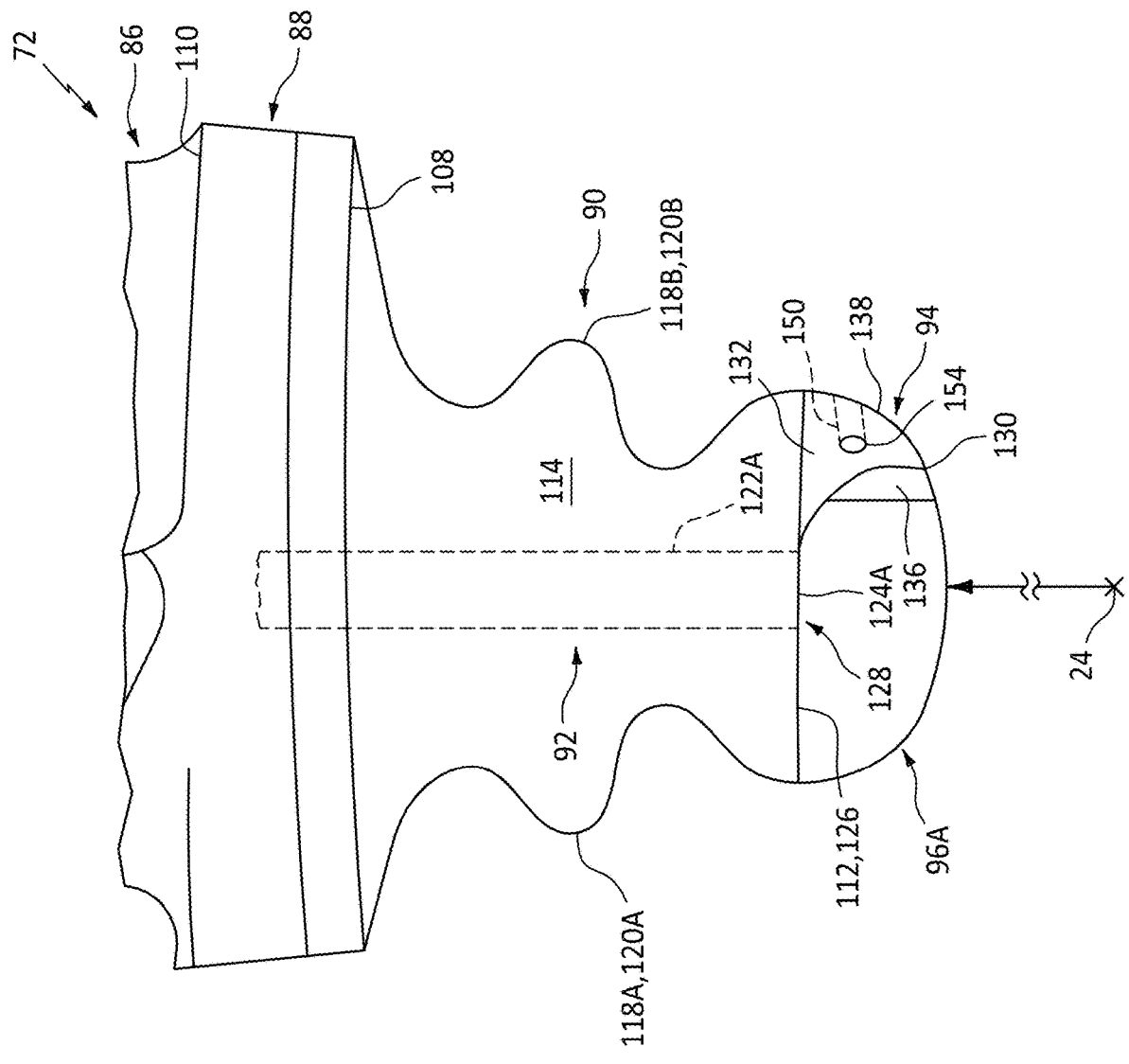
FIG. 7 is a partial end view illustration of the rotor blade at the blade root.

The blade root 90 projects radially inwards (e.g., towards the axis 24) out from the blade platform 88 to a distal radial inner end 112 (e.g., a bottom end) of the blade root 90. The blade root 90 extends axially along the axis 24 from an axial upstream end 114 of the blade root 90 to an axial downstream end 116 of the blade root 90. Here, the root upstream end 114 is upstream of the root downstream end 116 relative to the flow of gas (e.g., the combustion products) within the core flowpath 58 longitudinally across the respective rotor blade 72. Referring to FIG. 7, the blade root 90 extends laterally between and to opposing lateral sides 118A and 118B (generally referred to as "118") of the blade root 90. Each of these lateral root sides 118A, 118B may be at least partially or completely formed by a respective laterally undulating (e.g., a wavy, splined) surface 120A, 120B (generally referred to as "120") of the blade root 90. With this arrangement, the blade root 90 may be configured as a firtree root. The present disclosure, however, is not limited to such an exemplary geometry. For example, in other embodiments, the blade root 90 may alternatively be configured as a dovetail root or a root with another flared and/or keyed geometry.

Referring to FIG. 5, the cooling circuit 92 is configured to direct cooling air (e.g., air bled from the core flowpath 58 upstream of the combustor of FIG. 1) into the respective rotor blade 72, for example, to facilitate film cooling of the blade airfoil 86 and/or the blade platform 88 during turbine engine operation. The cooling circuit 92 of FIG. 5 includes one or more cooling air passages 122A-C (generally referred to as "122"). Each of these cooling air passages 122A-C projects radially into the respective rotor blade 72 and its blade root 90 from an inlet 124A, 124B, 124C (generally referred to as "124") into the respective cooling air passage 122A-C. More particularly, each cooling air passage 122 of FIG. 5 projects radially outward from its passage inlet 124, through the blade root 90 and the blade platform 88, into the blade airfoil 86.

Figure 8:
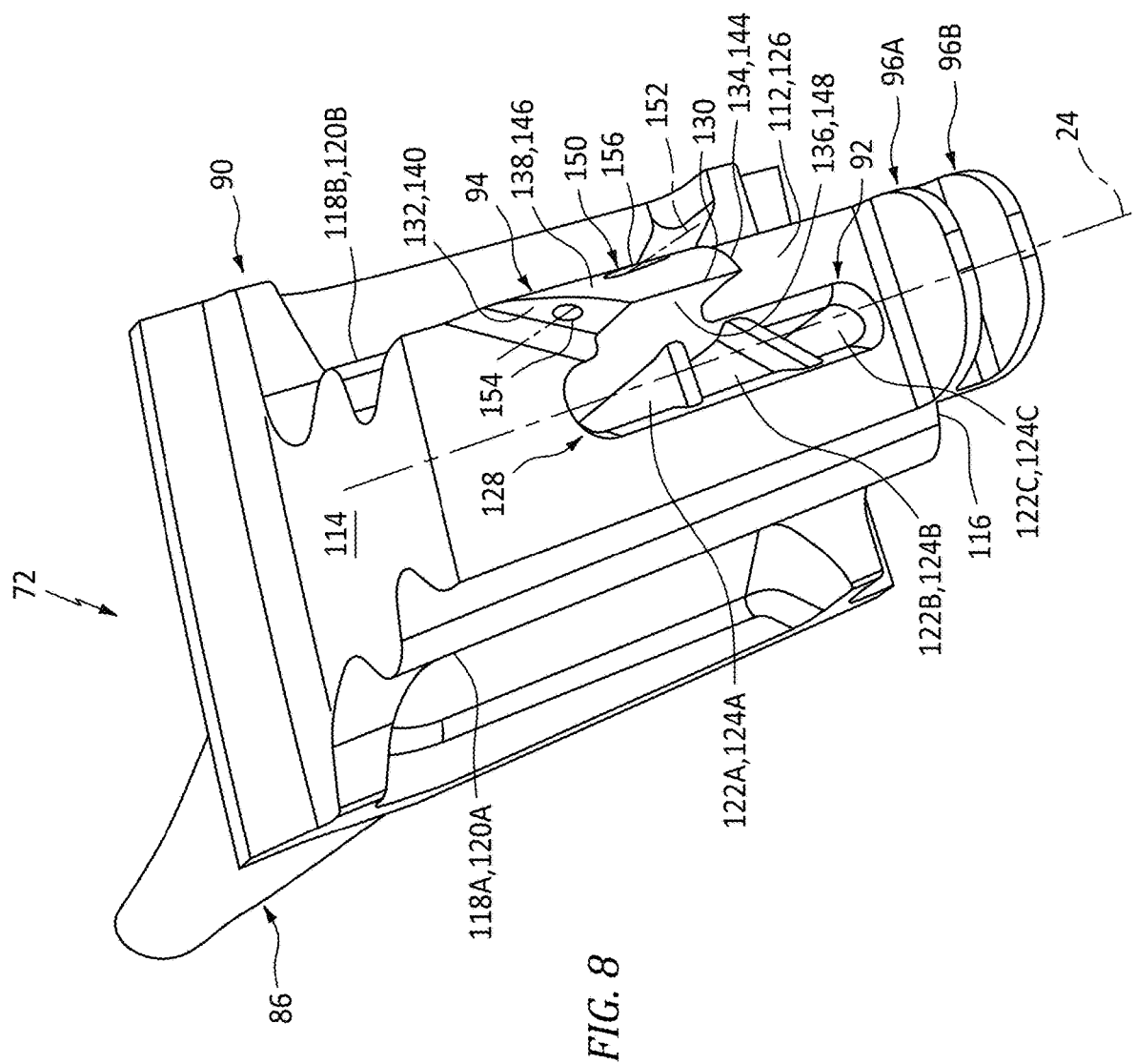
FIG. 8 is a perspective illustration of the rotor blade.

The passage inlets 124 may be disposed at the root inner end 112. Each passage inlet 124 of FIG. 8, for example, is formed in a radial inner surface 126 (e.g., a planar bottom surface) of the blade root 90 at the root inner end 112. More particularly, each passage inlet 124 of FIG. 8 pierces the root inner surface 126. The passage inlets 124 of FIG. 8 are arranged in an axially extending array 128. This inlet array 128 and each of its passage inlets 124 are axially spaced from the root upstream end 114 and the root downstream end 116. The inlet array 128 and each of its passage inlets 124 are also laterally spaced from the root first side 118A and the root second side 118B. The inlet array 128 of FIG. 8, for example, may be substantially axially and/or laterally centered along the root inner end 112 and its root inner surface 126. The present disclosure, however, is not limited to such an exemplary arrangement.

Figure 9:
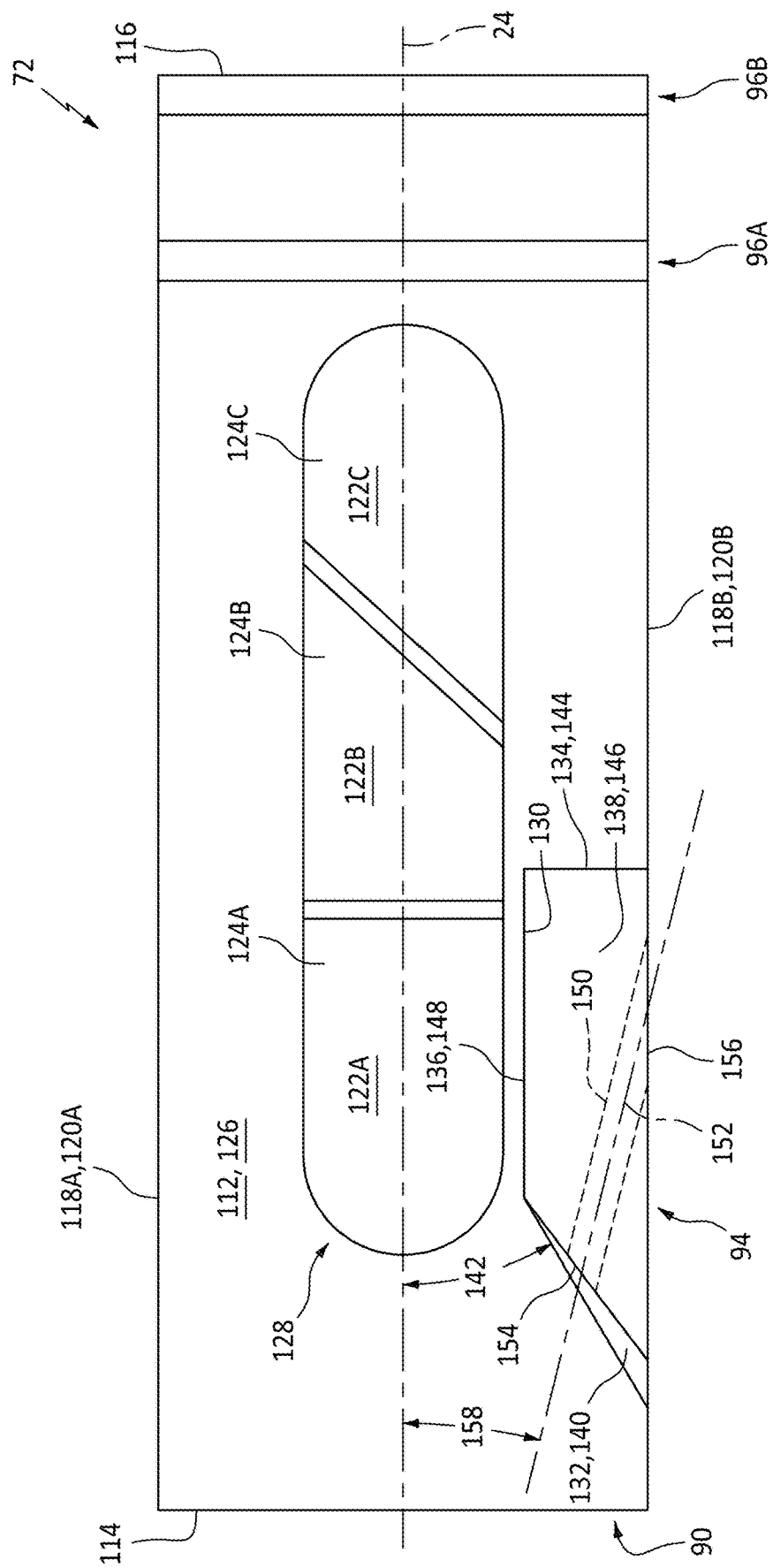
FIG. 9 is an illustration of an inner end of the blade root.

The cooling air deflector 94 is disposed at the root inner end 112 and connected to (e.g., formed integral with or otherwise attached to) the blade root 90. The cooling air deflector 94 of FIG. 8, for example, projects radially inwards out from the blade root 90 and its root inner end 112 to a distal radial inner end 130 (e.g., a bottom tip) of the cooling air deflector 94. Referring to FIG. 9, the cooling air deflector 94 extends axially along the axis 24 from an axial upstream end 132 of the cooling air deflector 94 to an axial downstream end 134 of the cooling air deflector 94. The cooling air deflector 94 extends laterally between a lateral interior side 136 of the cooling air deflector 94 and a lateral exterior side 138 of the cooling air deflector 94; see also FIG. 8.

The cooling air deflector 94 and its deflector upstream end 132 of FIG. 9 are axially spaced from the root upstream end 114 by an axial first distance. The cooling air deflector 94 and its deflector downstream end 134 of FIG. 9 are axially spaced from the root downstream end 116 by an axial second distance that is sized larger than the first distance. Here, the first distance and the second distance are sized such that the cooling air deflector 94 and its deflector interior side 136 axially overlap at least one of the passage inlets 124; e.g., the upstream passage inlet 124A. The cooling air deflector 94 of FIG. 9 and its deflector interior side 136, for example, extend axially along at least an axial major extent (e.g., at least 50%, 75% or 90%) of the upstream passage inlet 124. The cooling air deflector 94 and its deflector interior side 136 may (or may not) also extend axially along at least an axial minor extent (e.g., less than 75%, 50% or 25%) of another one of the passage inlets 124; e.g., the intermediate passage inlet 124B.

The cooling air deflector 94 is disposed laterally between (a) the inlet array 128 and one or more of its passage inlets 124 and (b) the root second side 118B. The cooling air deflector 94 of FIG. 9 and its deflector interior side 136, for example, are (e.g., slightly) axially spaced from the inlet array 128 and its passage inlets 124A and 124B by a lateral distance that is less than a lateral thickness of the cooling air deflector 94. The cooling air deflector 94 or FIG. 9 and its deflector exterior side 138 are disposed at the root second side 118B. More particularly, the deflector exterior side 138 of FIG. 9 is continuous with the root second side 118B; see also FIGS. 7 and 8. The cooling air deflector 94 of the present disclosure, however, is not limited to such an exemplary arrangement. The cooling air deflector 94 and its deflector interior side 136 may alternatively be arranged directly at sides of the passage inlets 124A and 124B in other embodiments.

An upstream surface 140 of the cooling air deflector 94 at the deflector upstream end 132 is angularly offset from the axis 24 by an offset angle 142 when viewed, for example, in a first reference plane parallel with (e.g., including) the axis 24 and/or parallel with the root inner end 112 and its root inner surface 126. The offset angle 142 is a non-zero acute angle, for example, between ten degrees (10°) and eighty degrees (80°); e.g., between thirty degrees (30°) and sixty degrees (60°). The deflector upstream end 132 and its deflector upstream surface 140 are thereby ramped laterally towards the upstream passage inlet 124A. A downstream surface 144 of the cooling air deflector 94 at the deflector downstream end 134 may be perpendicular to the axis 24 when viewed, for example, in the first reference plane. With this arrangement, the cooling air deflector 94 axially tapers as the cooling air deflector 94 extends laterally from its deflector exterior side 138 to its deflector interior side 136. The cooling air deflector 94 of the present disclosure, however, is not limited to such an exemplary arrangement. The deflector downstream surface 144 may alternatively be (e.g., slightly) angularly offset from the axis 24 by a non-zero acute angle in other embodiments.

Referring to FIG. 8, the deflector exterior side 138 may extent laterally along the deflector upstream end 132 and the deflector downstream end 134 and meet the deflector interior side 136 at the deflector inner end 130. An exterior surface 146 of the cooling air deflector 94 of FIG. 8 at the deflector exterior side 138, for example, is a curved (e.g., arcuate) surface. This deflector exterior surface 146 is contiguous with the root second surface 120B at an interface between the cooling air deflector 94 and the blade root 90. The deflector exterior surface 146 meets an interior surface 148 (e.g., a substantially planar surface) of the cooling air deflector 94 at its deflector interior side 136 at the deflector inner end 130. The deflector exterior surface 146 extends axially between the deflector upstream surface 140 and the deflector downstream surface 144 both along the root second side 118B and the deflector inner end 130.

Figure 10A:
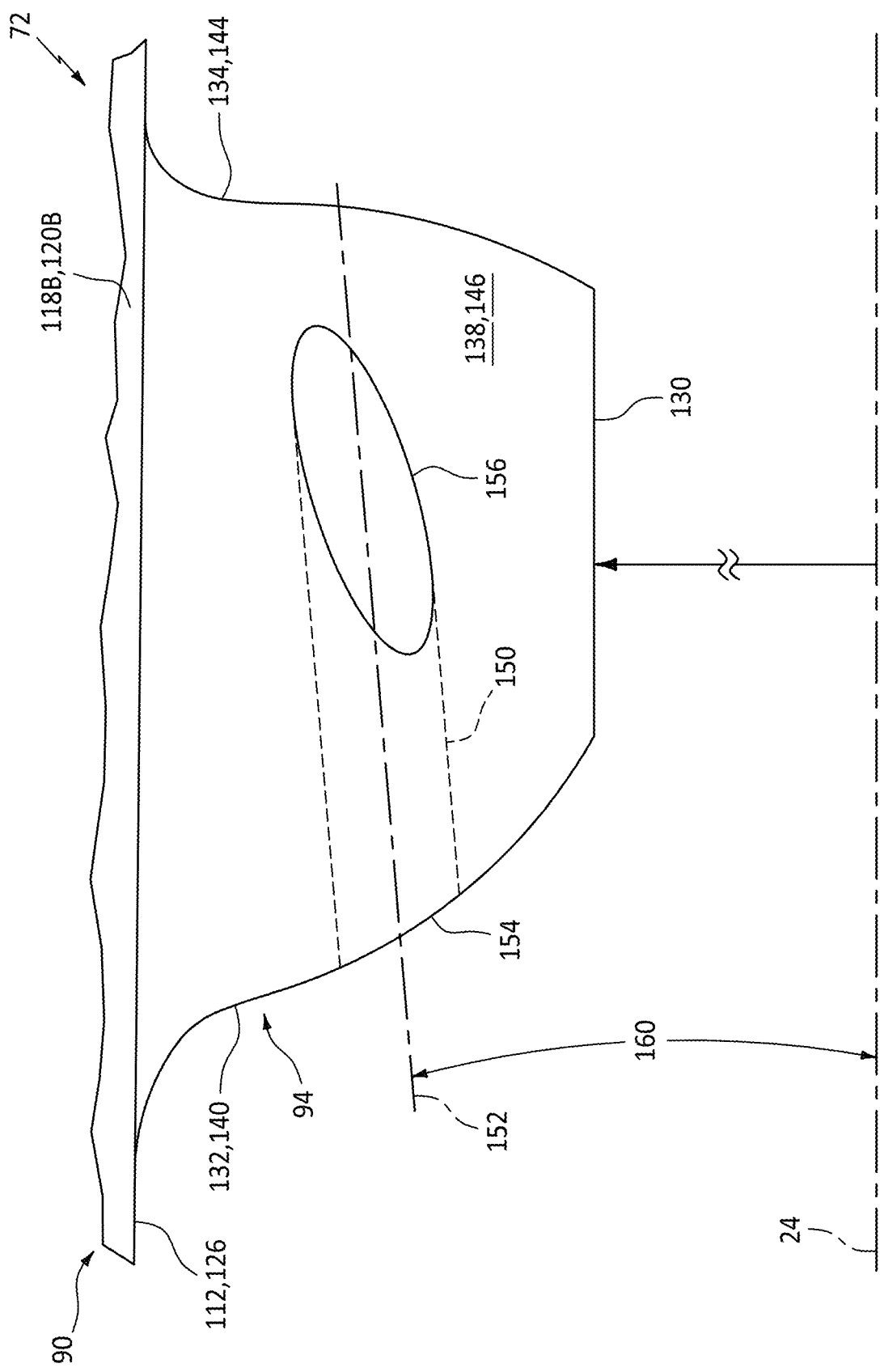
FIGS. 10A and 10B are illustrations of a cooling air deflector with various cooling air aperture arrangements.
Figure 10B:
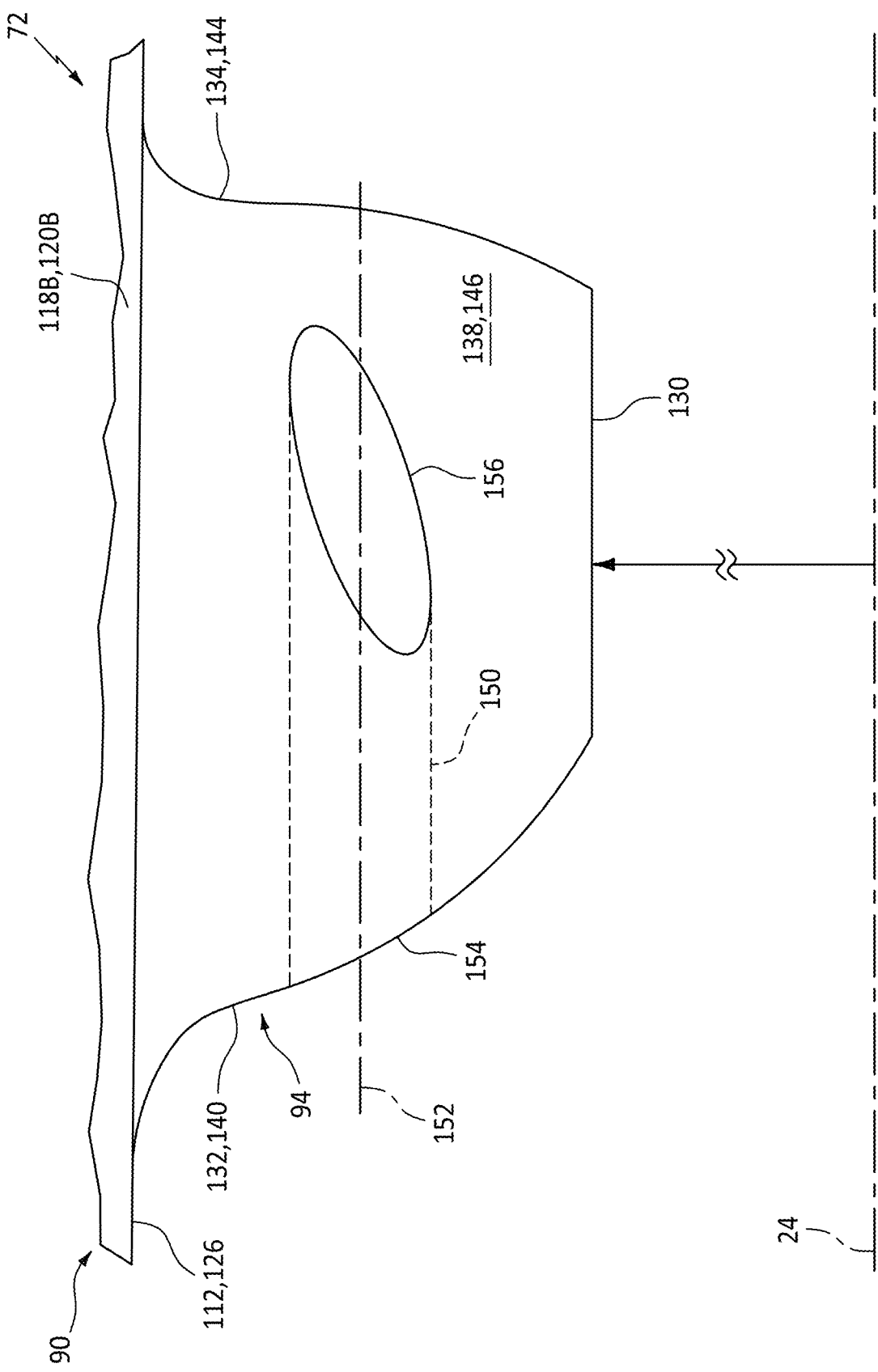

Referring to FIG. 9, the cooling air deflector 94 includes at least (or only) one cooling air aperture 150. This cooling air aperture 150 extends laterally and axially, along a centerline 152 of the cooling air aperture 150, through the cooling air deflector 94 from an inlet 154 into the cooling air aperture 150 to an outlet 156 from the cooling air aperture 150. The aperture inlet 154 is disposed at the deflector upstream end 132 and pierces the deflector upstream surface 140; see also FIG. 8. The aperture outlet 156 is disposed at the deflector exterior side 138 and pierces the deflector exterior surface 146; see also FIG. 8. The aperture centerline 152 may follow a straight-line trajectory. The aperture centerline 152 of FIG. 9 is angularly offset from the axis 24 by an offset angle 158 when viewed, for example, in the first reference plane. The offset angle 158 is a non-zero acute angle, for example, less than seventy five degrees (75°); e.g., between ten degrees (10°) and sixty degrees (60°). Referring to FIG. 10A, the aperture centerline 152 may be angularly offset from the axis 24 by another offset angle 160 when viewed, for example, in a second reference plane parallel with (e.g., including) the axis 24 and/or perpendicular to the root inner end 112 and its root inner surface 126. The offset angle 160 is a non-zero acute angle, for example, less than sixty degrees (60°); e.g., between five degrees (5°) and thirty degrees (30°). Here, the aperture centerline 152 is tilted radially outward such that the aperture outlet 156 is disposed further radially outward away from the axis 24/radially closer to the blade root 90 than the aperture inlet 154. Alternatively, referring to FIG. 10B, the aperture centerline 152 may be parallel with the axis 24 when viewed, for example, in the second reference plane.

Figure 11B:
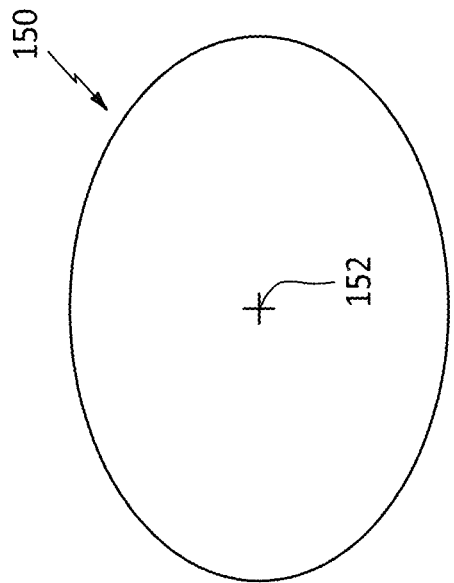
FIGS. 11A and 11B are illustrations of the cooling air aperture with various cross-sectional geometries.
Figure 11A:
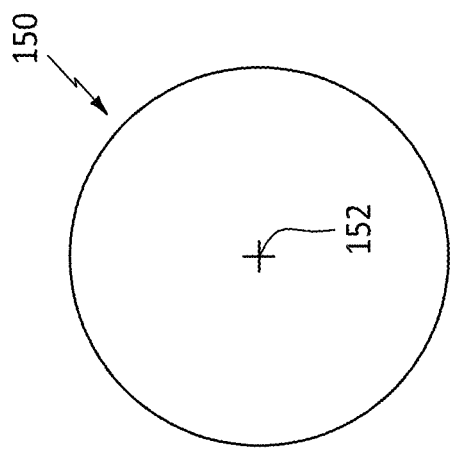

Referring to FIGS. 11A and 11B, the cooling air aperture 150 has a cross-sectional geometry when viewed in a third reference plane perpendicular to the aperture centerline 152.

Referring to FIG. 11A, this cross-sectional geometry may be circular. Alternatively, referring to FIG. 11B, the cross-sectional geometry may be non-circular; e.g., oval, elliptical, oblong, etc.

Referring to FIG. 9, the flanges 96 are arranged axially along the blade root 90 between (a) the inlet array 128 and the cooling air deflector 94 and (b) the root downstream end 116. The upstream flange 96A of FIG. 9, for example, is located axially between and spaced from a downstream end of the inlet array 128 and the downstream flange 96B. The downstream flange 96B is located at the root downstream end 116. Referring to FIG. 8, each of these flanges 96 is connected to (e.g., formed integral with or otherwise attached to) the blade root 90. Each of the flanges 96 projects radially inward out from the blade root 90 and its root inner end 112 to a distal radial inner end of the respective flange 96. Each of the flanges 96 extends laterally between and to the opposing lateral sides 118 of the blade root 90 along the root inner end 112.

Referring to FIG. 4, the blade root 90 is mated with the disk slot 74 to mount the respective rotor blade 72 to the rotor disk 70. Within the disk slot 74, the root first side surface 120A is disposed next to and substantially follows a contour of the slot first surface 84A. Similarly, the root second side surface 120B is disposed next to and substantially follows a contour of the slot second surface 84B. With this arrangement, the blade root 90 radially fixes the respective rotor blade 72 to the rotor disk 70. Here, a plenum 162 is formed by and extends radially between the blade root 90 and its root inner end 112 and the rotor disk 70 and its slot inner endwall 80.

During turbine engine operation, the cooling air is directed into the plenum 162. This cooling air may enter the plenum 162 at the root upstream end 114. As the engine rotor 68 rotates (e.g., counterclockwise) about the axis 24 of FIG. 4, the cooling air may tend to be at a lateral second side of the plenum 162 when entering the plenum 162. The cooling air deflector 94 of FIG. 9 and its deflector upstream surface 140 thereby directs a major portion (e.g., more than 90%) of the incoming cooling air laterally towards the inlet array 128 (see FIG. 8). The cooling air may thereby be directed into the passage inlets 124 with less swirling within the plenum 162 (see FIG. 4). By contrast, the cooling air aperture 150 of FIG. 4 may direct a minor portion (e.g., less 10%) of the incoming cooling air into a small clearance gap 164 between the cooling air deflector 94 and the slot second sidewall 82B. By directing this minor portion of the cooling air into the clearance gap 164, stagnant air within the clearance gap 164 may be flushed out into the plenum 162 and the deflector exterior side 138 may be cooled. In addition to the foregoing, inclusion of the cooling air aperture 150 also reduces an overall rotating weight of the respective rotor blade 72.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
   a rotor blade configured to rotate about an axis, the rotor blade including an airfoil, a root, a cooling air passage and a cooling air deflector;
   the root extending axially along the axis between a first end of the root and a second end of the root, the root extending laterally between a first side of the root and a second side of the root, and the root projecting radially inward towards the axis and away from the airfoil to an inner end of the root;
   the cooling air passage comprising a passage inlet disposed at the inner end of the root, and the cooling air passage projecting radially into the rotor blade from the passage inlet;
   the cooling air deflector projecting radially inward towards the axis from the inner end of the root to an inner end of the cooling air deflector, the cooling air deflector disposed at the second side of the root and spaced laterally from the first side of the root, and the cooling air deflector comprising a cooling air aperture that extends laterally through the cooling air deflector;
   the cooling air deflector extending axially between a first end of the cooling air deflector and a second end of the cooling air deflector;
   the cooling air deflector extending laterally between a first side of the cooling air deflector and a second side of the cooling air deflector; and
   the cooling air aperture extending laterally through the cooling air deflector from an aperture inlet to an aperture outlet, the aperture inlet disposed at the first end of the cooling air deflector, and the aperture outlet disposed at the second side of the cooling air deflector.

2. The apparatus of claim 1, wherein the cooling air aperture further extends axially through the cooling air deflector.

3. The apparatus of claim 1, wherein a centerline of the cooling air deflector is angularly offset from the axis by an acute offset angle when viewed in a reference plane parallel to the inner end of the root.

4. The apparatus of claim 3, wherein the acute offset angle is between ten degrees and sixty degrees.

5. The apparatus of claim 1, wherein a centerline of the cooling air deflector is angularly offset from the axis by an acute offset angle when viewed in a reference plane perpendicular to the inner end of the root.

6. The apparatus of claim 5, wherein the acute offset angle is equal to or less than sixty degrees.

7. The apparatus of claim 1, wherein a centerline of the cooling air deflector is parallel with the axis when viewed in a reference plane perpendicular to the inner end of the root.

8. The apparatus of claim 1, wherein the cooling air aperture has a circular cross-sectional geometry when viewed in a reference plane perpendicular to a centerline of the cooling air aperture.

9. The apparatus of claim 1, wherein the cooling air aperture has a non-circular cross-sectional geometry when viewed in a reference plane perpendicular to a centerline of the cooling air aperture.

10. The apparatus of claim 1, wherein the second side of the cooling air deflector is contiguous with the second side of the root.

11. The apparatus of claim 1, wherein the first side of the cooling air deflector is laterally next to the passage inlet.

12. The apparatus of claim 1, wherein
   the cooling air deflector is disposed laterally between the passage inlet and the second side of the root; and
   the cooling air deflector axially overlaps along the passage inlet.

13. The apparatus of claim 1, wherein the root is a firtree root.

14. The apparatus of claim 1, wherein the root includes a first laterally undulating surface and a second laterally undulating surface, the first laterally undulating surface at least partially forms the first side of the root, and the second laterally undulating surface at least partially forms the second side of the root.

15. The apparatus of claim 1, wherein the rotor blade further includes a platform radially between and connecting the airfoil and the root.

16. The apparatus of claim 1, further comprising:
a rotor disk configured to rotate about the axis;
the rotor disk comprising a slot;
the root mated with the slot to mount the rotor blade to the rotor disk; and
the cooling air aperture configured to direct cooling air to a clearance gap between the cooling air deflector and a sidewall of the slot.

17. An apparatus for a turbine engine, comprising:
a rotor blade configured to rotate about an axis, the rotor blade including an airfoil, a root, a cooling air passage and a cooling air deflector;
the root extending axially along the axis between a first end of the root and a second end of the root, the root extending laterally between a first side of the root and a second side of the root, and the root projecting radially inward towards the axis and away from the airfoil to an inner end of the root;
the cooling air passage comprising a passage inlet disposed at the inner end of the root, and the cooling air passage projecting radially into the rotor blade from the passage inlet; and
the cooling air deflector projecting radially inward towards the axis from the inner end of the root to an inner end of the cooling air deflector, the cooling air deflector disposed at the second side of the root and spaced laterally from the first side of the root, and the cooling air deflector comprising a cooling air aperture that extends laterally through the cooling air deflector;
wherein the rotor blade further includes a flange disposed between (a) the passage inlet and the cooling air deflector and (b) the second end of the root;
wherein the flange projects radially inward towards the axis from the inner end of the root; and
wherein the flange extends laterally across the inner end of the root from the first side of the root to the second side of the root.

18. An apparatus for a turbine engine, comprising:
a rotor disk configured to rotate about an axis and comprising a slot; and
a rotor blade including an airfoil, a root, a cooling air passage and a cooling air deflector;
the root received within the slot to mount the rotor blade to the rotor disk;
the cooling air passage projecting radially into the root from a passage inlet in a bottom end of the root, the passage inlet fluidly coupling the cooling air passage to a plenum radially between the bottom end of the root and a bottom end of the slot;
the cooling air deflector configured to direct a first portion of cooling air flowing within the plenum towards the passage inlet; and
the cooling air deflector comprising a cooling air aperture configured to direct a second portion of cooling air flowing within the plenum to a clearance gap laterally between the cooling air deflector and a sidewall of the slot.

* * * * *